United States Patent
Fagergren et al.

(10) Patent No.: US 7,320,506 B2
(45) Date of Patent: Jan. 22, 2008

(54) METHOD FOR RECONDITIONING A FRICTION COUPLE IN A SERVICE BRAKE AND A VEHICLE INCLUDING A FRICTION COUPLE ARRANGED IN SAID VEHICLE

(75) Inventors: Mats Fagergren, Kungälv (SE); Johan Hultèn, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 751 days.

(21) Appl. No.: 10/605,596

(22) Filed: Oct. 10, 2003

(65) Prior Publication Data

US 2004/0130211 A1 Jul. 8, 2004

Related U.S. Application Data

(63) Continuation of application No. PCT/SE02/00712, filed on Apr. 10, 2002, now abandoned.

(30) Foreign Application Priority Data

Apr. 10, 2001 (SE) .............................. 0101253

(51) Int. Cl.
*B60T 8/32* (2006.01)
*F16D 66/00* (2006.01)

(52) U.S. Cl. ................... 303/191; 188/1.11 R
(58) Field of Classification Search ........... 188/1.11 R, 188/1.11 W, 1.11 E, 1.11 L; 303/191
See application file for complete search history.

(56) References Cited

U.S. PATENT DOCUMENTS

| | | | |
|---|---|---|---|
| 4,361,988 A | 12/1982 | Gramlich | 51/118 |
| 4,790,606 A * | 12/1988 | Reinecke | 303/191 |
| 5,570,937 A * | 11/1996 | Wolfsried | 303/191 |
| 6,409,289 B2 * | 6/2002 | Wagner et al. | 303/191 |
| 6,671,604 B1 * | 12/2003 | Frentz et al. | 701/70 |
| 6,695,416 B1 * | 2/2004 | Reiner | 303/125 |
| 2002/0014801 A1 | 2/2002 | Wagner et al. | 303/191 |
| 2003/0090145 A1 * | 5/2003 | Andersson et al. | 303/9 |

FOREIGN PATENT DOCUMENTS

| | | |
|---|---|---|
| EP | 974505 A1 | 1/2000 |
| SE | 514229 C2 | 2/2002 |

* cited by examiner

*Primary Examiner*—Robert A. Siconolfi
(74) *Attorney, Agent, or Firm*—Novak Druce & Quigg, LLP

(57) ABSTRACT

Method and apparatus for providing a vehicle having a service brake of the drum or disc brake type, a secondary brake, a control system for the distribution of a requested brake power between the service brake and secondary brake and an arrangement for the reconditioning of a friction pair forming part of the service brake. The method is for the reconditioning of a friction pair in a service brake of the drum or disc brake type forming part of a brake system in a vehicle, which in addition to the service brake having a secondary brake and a control system for distribution of the requested brake power between the service brake and secondary brake.

23 Claims, 8 Drawing Sheets

METHOD FOR RECONDITIONING A FRICTION COUPLE IN A SERVICE BRAKE AND A VEHICLE INCLUDING A FRICTION COUPLE ARRANGED IN SAID VEHICLE

CROSS REFERENCE TO RELATED APPLICATIONS

The present application is a continuation patent application of International Application No. PCT/SE02/00712 filed 10 Apr. 2002 now abandoned which was published in English pursuant to Article 21(2) of the Patent Cooperation Treaty, and which claims priority to Swedish Application No. 0101253-3 filed 10 Apr. 2001. Both applications are expressly incorporated herein by reference in their entireties.

BACKGROUND OF INVENTION

1. Technical Field

The invention relates to a method for the reconditioning of a friction pair in a service brake of the drum or disc brake type forming part of a brake system of a vehicle, which in addition to the said service brake comprises one or more auxiliary brakes and a control system for distributing the requested brake power between the said service brake and auxiliary brakes. The invention also relates to a vehicle containing an arrangement for the reconditioning of a friction pair according to the pre-characterizing part of claim 19.

2. Background Art

In addition to the usual service brakes in the form of disc or drum brakes, use is made, in modern, heavy vehicles, of a number of auxiliary brakes or secondary brake units, in the form, for example, of hydraulic or electric retarders and engine brakes. Auxiliary brakes are used, where appropriate, to recover braking energy as useful energy and to prolong the life of service brakes. Vehicles equipped with both service brake and auxiliary brakes or secondary brake unit utilize either manual application of service brake and auxiliary brakes or secondary brake units, or automatically controlled application of service brake and auxiliary brakes or secondary brake unit, where a control unit selects the distribution of brake power between service brake and auxiliary brakes or secondary brake unit as a function of the operating condition of the vehicle. An example of a system for controlling a brake system comprising a service brake and an auxiliary brake is described in EP 974 505. The control system ensures that the auxiliary brake is used in each application of the brakes. In a preferred embodiment, the auxiliary brake is used to such an extent that the risk of glazing is reduced. The term glazing refers to the formation of compounds with lower friction than the nominal friction. These compounds can occur when the temperature of the brake disc or the brake drum becomes too low during a large proportion of the brake applications.

One problem with vehicles using a control system according to EP 974 505 and other vehicles currently encountered, in which the brake power is distributed manually or automatically between service brakes and auxiliary brakes or secondary brake unit, or sometimes also with vehicles having no auxiliary brakes or secondary brake unit, is that the service brakes are not used sufficiently. This leads to a risk of rusting or the formation of dirt deposits on the brake disk or brake drum and the aforementioned glazing. The occurrence of rusting and dirt deposits means that the friction of the brake disc or brake drum is reduced, which reduces the efficiency of the brake system.

At high temperature, rust can be converted into a very wear-resistant phase. If the rust is unevenly distributed, this leads to variations in thickness and variations in friction along the circumference. In addition to wear-resistant iron oxides, martensite may also be formed at high temperature. Martensite is hard, brittle and wear-resistant. There is therefore a risk of incipient cracks, uneven wear and variations in thickness and friction should the brakes become overheated.

SUMMARY OF INVENTION

The object of the invention is to provide a method for the control of a brake system, which is capable of ensuring that the efficiency of the brake system is maintained. This object is achieved by a method for the reconditioning of a friction pair in a service brake of the drum or disc brake type according to claim 1 and 49 and a vehicle according to claim 19.

By providing a method for the reconditioning of a friction pair, as proposed in claim 1, in which a parameter value of a surface characteristic of the friction pair is determined, and the friction pair is reconditioned by the supply of a defined braking energy to the said friction surface as a function of the said parameter value determined, a friction pair is obtained in which the said parameter value of the said surface characteristic is kept within a given interval.

The term defined braking energy refers to an amount of energy that is determined as a function of the parameter value determined for the surface characteristic. The defined braking energy is mainly determined from information on the deviation of the parameter value $I_{determined}$ of the surface characteristic from the set-point value $I_{setpoint}$ for the surface characteristic. Account is also taken of how much braking energy is available in a certain driving situation. This is determined mainly by deciding to what degree the service brake can be prioritized compared to other secondary brakes present on the vehicle. If the service brake is given a higher priority, more braking energy is supplied and vice-versa. In preferred embodiments, account is also taken of the temperature of the friction pair. The regeneration exploits the fact that the parameter value for the reconditionable surface characteristic, such as the coefficient of friction and the covering of dirt or rust on the friction pair, for example, varies as a function of the amount of braking energy supplied. In a first approximation, an addition to the parameter value for the supply of braking energy is obtained, which is proportional to the amount of energy supplied. The braking energy is represented by the time integral of the brake power supplied to the friction pair.

Through the regeneration process with controlled energy supply it is ensured that sufficient energy is supplied to the service brake to continuously maintain a friction pair where a parameter value of a surface characteristic corresponding, for example, to the coefficient of friction and/or the prevalence of dirt or rust is kept within a given interval, thereby reducing the risk of rust and dirt prevalence, and reducing the risk of glazing. According to a preferred embodiment, it is ensured that braking energy is not supplied unnecessarily when the temperature of the service brakes exceeds a specific limit, thereby reducing the risk of martensites and other resistant constituents being formed at high temperature. In a preferred embodiment of the invention, the said defined braking energy is supplied at a temperature of the friction pair that exceeds a defined regeneration temperature. By means of this process, a clean friction pair is obtained, in which the occurrence of rust and dirt deposits is reduced in a controlled manner, thereby ensuring the efficiency of the brake system. This system is particularly advantageous in reducing the risk of glazing. According to a further preferred embodiment a process is provided in which the said defined braking energy is supplied at a temperature of the friction pair that is less than a defined temperature limit, thereby reducing the risk of martensites and other resistant constituents being formed at high temperature.

In an especially preferred embodiment of the invention, the glazing characteristic is separated from the rust and/or dirt formation characteristic, so that separate regeneration programs can be performed for glazing and rust and/or dirt. By means of this process, conditioned brakes are obtained without unnecessary wear and tear on the brakes.

According to a method for the reconditioning of a service brake as proposed in claim 49, a control unit is provided, which can assume a first operating mode in which the auxiliary brake is prioritized, and a second operating mode in which the service brake is prioritized. The method comprises the following stages:

determination of a parameter value (I) for a reconditionable surface characteristic, such as the coefficient of friction and the covering of dirt or rust on the friction pair, for example, selection of the operating mode as a function of the said parameter value determined. The method described ensures that sufficient energy is supplied to the service brake to regenerate the parameter value I and thereby keep the service brake in good condition.

Correspondingly, claim 19 also provides for a vehicle having the advantages afforded by the methods described in claim 1 and 49.

BRIEF DESCRIPTION OF DRAWINGS

The invention will be described in more detail below with reference to figures of the drawing attached, in which.

DETAILED DESCRIPTION

Figure 1:
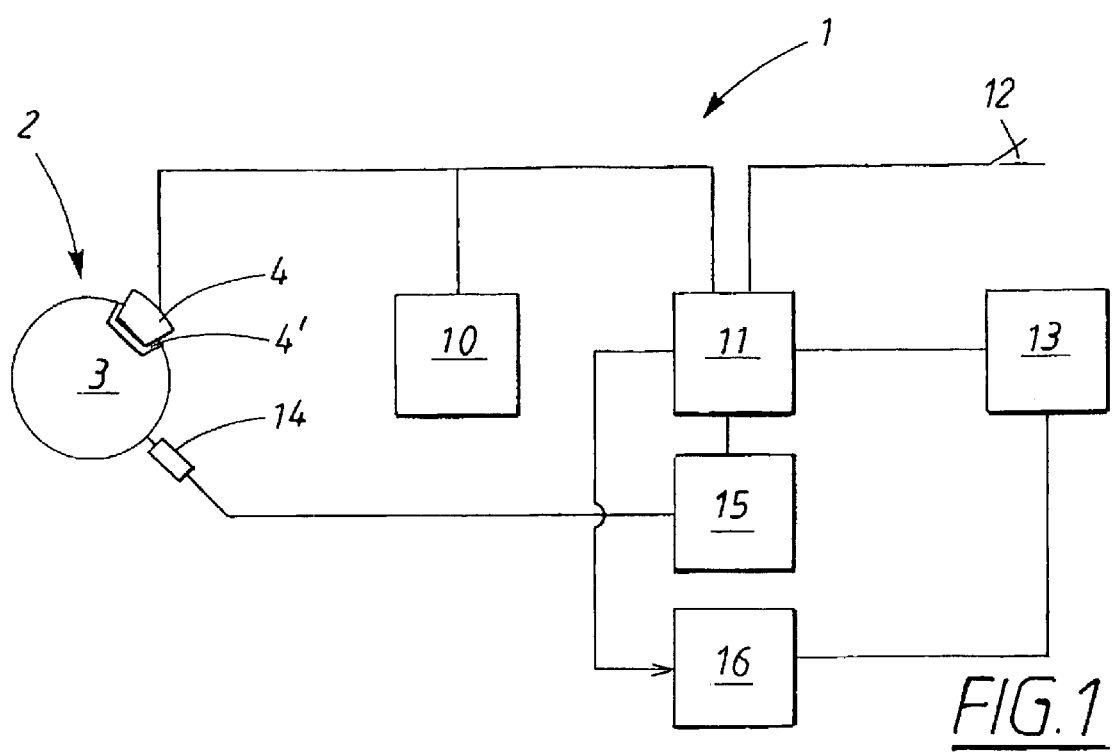
FIG. 1 shows a diagram of a system for the reconditioning of a friction pair in a service brake.

FIG. 1 shows a diagram of a system for the reconditioning 1 of a friction pair comprising a brake lining and a rotor forming part of a service brake. The rotor is usually made of a cast iron alloy and the brake lining of an organic material with metal fibers mixed in. The system comprises a service brake 2 for a vehicle (not shown). In the embodiment shown, the service brake is of the disc or drum brake type and has a friction pair 3 comprising a brake lining and a rotor.

Figure 3:
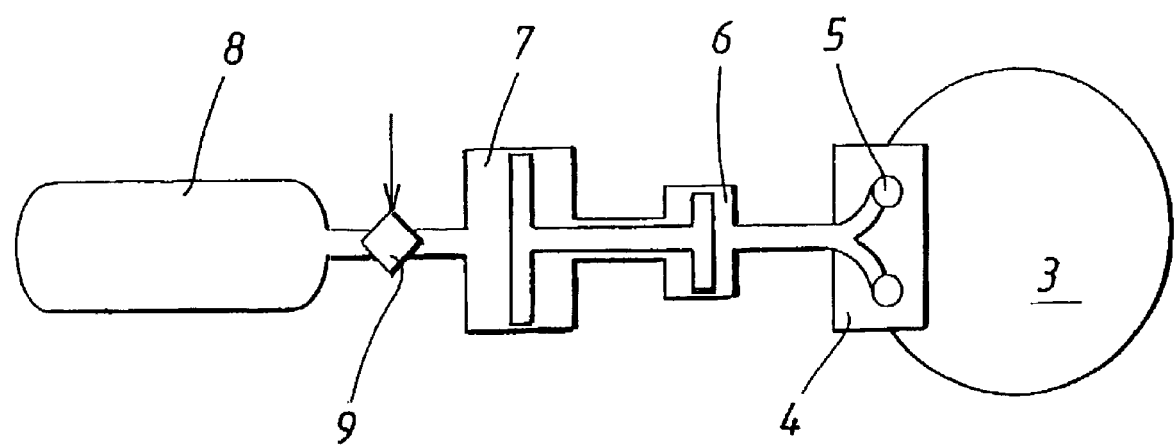
FIG. 3 shows an example of a disc brake.

In the example shown the service brake consists of a disc brake, which has a brake caliper 4. The brake caliper 4, in a manner known in the art, comprises axially moveable brake linings and pressurizing elements in the form, for example, of a number of hydraulic cylinders, pneumatic cylinders or electronic application devices, which when activated are capable of pressing the linings against the rotor which, where a disc brake is used, is shaped as a disc. If a hydraulic cylinder is used, as shown in the example in FIG. 3, this is conventionally pressurized, for example by a brake arrangement as shown in FIG. 3, in which a conventional disc brake has a brake disc 3 and a brake caliper 4, which supports hydraulic cylinders 5 and brake pads. The hydraulic cylinders 5 are fed from a master cylinder 6, which is pressurized by a servo brake cylinder 7, which is mechanically connected to the master cylinder 6. The servo brake cylinder 8 is in turn fed from a hydraulic reservoir 8 via a controlled valve 9. The invention is obviously not limited to a particular type of brake but can be used on different types of disc or drum brakes. In an alternative embodiment the service brake therefore consists of a conventional drum brake.

The reconditioning system furthermore comprises a secondary brake 10 of conventional type in the form, for example, of hydraulic or electric retarders and engine brakes. The reconditioning system further comprises a control system 11 for distributing a requested brake power between the said service brake 3 and secondary brake 10. The control system 11 primarily comprises an input signal from a brake pedal 12, which generates a requested brake power.

The control system 11 thereupon distributes the brake power between secondary brake and service brake. According to one embodiment of the invention, the control system 11 is arranged to work in two separate operating modes. In a first operating mode the brake power is conventionally distributed between service brake and auxiliary brake, for example in that a brake system control circuit distributes a requested brake power between auxiliary brakes and service brake. The control circuit may be designed to emit a first output signal to a control circuit for the said auxiliary brakes and a second output signal to a control circuit for the service brake. The first and the second output signal represent a brake power of between 0 and 100%. The sum of the signals corresponds to the requested brake power from a brake pedal situated in the vehicle. The distribution can in these cases be designed so that maximum use is made of the auxiliary brake, thereby reducing not only wear to the brake linings of the service brake but also the risk of overheating of the brake disc or brake drum. This means that the power available from the auxiliary brake is utilized 100%, and any brake power needed in addition to that is derived from the service brake. In a second operating mode the brake power is distributed so that the service brake is prioritized, thereby ensuring that sufficient energy is fed into the brake disc or brake drum, so that coverings in the form of rust or dirt are worn down and the friction material in the brake is restored to an acceptable condition. The term prioritizes refers to, according to one embodiment of the invention, allowing the service brake to be used to its maximum power before the auxiliary brake is used, which means that only the service brake is used. In a preferred embodiment, the control system 11 communicates with a control unit 13 in the vehicle, which is arranged to control other functions of the vehicle.

The system comprises an arrangement for reconditioning of the friction pair 3. The device comprises means 15 for determining a parameter value I for a reconditionable surface characteristic. According to one embodiment of the invention, the parameter value for the reconditionable surface characteristic is represented by the coefficient of friction and/or the degree of fouling and/or rusting on the surface of the rotor. The means 15 for determining the parameter value receives information containing data on a set of parameters which influence the parameter value for the surface characteristic from the vehicle's control unit 13. According to one embodiment, the parameters contain information on the force with which the brake lining is applied against the rotor and data on the acceleration of the vehicle and data on drive torque developed. From these data the means 15 for determining the parameter value calculates the coefficient of friction of the rotor. According to another embodiment of the invention, the information contains more or other parameters, which will be described in more detail below, from which the means 15 for determining the parameter value determines a parameter value I in a given operating situation.

From the parameter value I determined, means 16 for supplying a defined braking energy E determines a control strategy for the control system 11 for distribution of the brake power between service brake and auxiliary brake 10. A number of different control strategies are described below in connection with the description of FIG. 2, 4-6. The control strategies affect the distribution of the brake power derived via the service brake and via the auxiliary brake.

The means 16 for supplying a defined braking energy generally receives information regarding the parameter value I in a given operating situation. The means 16 compares this value I with the set limits Icr, Im. The means 16 for supplying a defined braking energy comprises a memory cell in which the current value for the parameter value I and the said limits Ic, Im are stored. The difference between the current parameter value I and the said limits Ic, Im provides information as to what supply of braking energy E will restore the parameter value to the desired value. The relationship between the energy supplied and the parameter value is described in more detail below.

From the brakings performed, which are randomly distributed in terms of time and brake power dependent on the prevailing driving situation, the parameter value I is updated. The defined braking energy E, which is supplied in order to restore the parameter value I to a desired value, is supplied via one or more applications of the brake, according to whether or not the braking situation allows sufficient energy to be supplied to the service brake in a given application of the brakes.

As is specified below, the impact of the defined braking energy E in turn depends on the temperature of the friction pair 3.

Also forming part of the system, according to one embodiment of the invention, is a temperature sensor 14, which measures the temperature of the friction material in the service brake 2. The temperature sensor 14 may also be arranged to estimate the temperature of the friction material by measuring the temperature of an element, which is thermally connected to the friction pair. According to further embodiments of the invention, the temperature may instead be estimated through calculations based on information regarding use of the service brake, in which a temperature margin is added to a current temperature value as a function of the energy supplied in each braking, and a continuous temperature reduction is added in as a function of the current temperature value and the time. According to one embodiment of the invention, a discretized description of the temperature value has the form:

$$T_{n+1} = T_n + T_E(E)\Delta t + T_Q(Q)\Delta t,$$

where $T = \dfrac{dT}{dt}$, $T_{n+1}$ represents the temperature at the time n+1, $T_E(E)$ the temperature change due to the energy supplied through braking, and $T_Q(Q)$ represents the temperature change due to radiated and dissipated energy.

Figure 2:
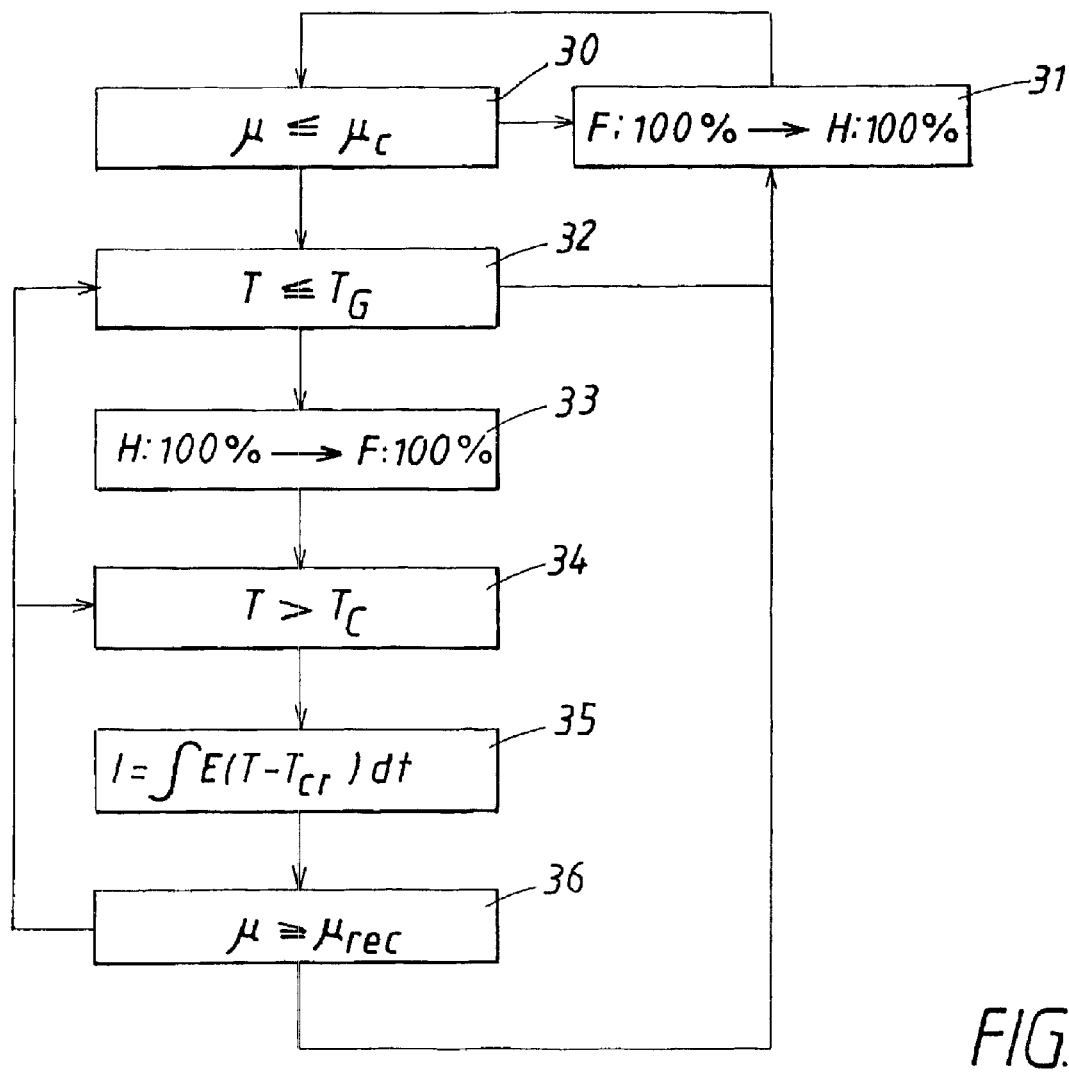
FIG. 2 shows a flow chart for a method of reconditioning a friction pair in a service brake.

FIG. 2 shows a flow chart for a method of reconditioning a friction pair in a service brake. The coefficient of friction μ of the friction pair is determined in a first function block 30.

According to a first embodiment of the invention, the coefficient of friction is determined through a retardation test in which brake shoes forming part of the service brake 2 are applied with a defined power against the said friction pair, following which the retardation of the vehicle is measured and the coefficient of friction is calculated from data on the said force and retardation. According to one embodiment of the invention, the application force of the brake shoes is estimated from the signal for the requested brake force from the brake pedal 12 and the given distribution between brake force applied via auxiliary brakes 10 and brake force applied via the service brake 2. According to one embodiment it is thus possible to estimate the brake force developed according to the equation $E_{service\ break} = E_{requested} *$ distribution %. According to an alternative embodiment, a sensor which measures the pressure in the brake cylinders can be used to determine the application force.

According to a second embodiment of the invention, the coefficient of friction is determined by an acceleration test in which brake shoes forming part of the said service brake are applied with a defined force against the friction pair, and an engine forming part of the vehicle is made to deliver an additional torque, whereupon the acceleration of the vehicle is measured and the coefficient of friction is calculated from data on the said force, acceleration and additional torque. According to this embodiment the control unit 13 sends an instruction to the engine, a given additional torque M being delivered whilst the brake shoes are applied with a defined force. During the test the control unit measures the acceleration, after which it is possible to calculate the co-efficient of friction. According to a preferred embodiment, either the additional torque or the application force or both of these are adjusted so that the acceleration value during the test is zero. This method of determining the coefficient of friction also has the advantage that regeneration occurs during the test.

According to one embodiment of the invention, after the coefficient of friction μ of the friction pair has been determined in a first function block 30, the value for the coefficient of friction μ is compared with a limit $\mu_c$. Should the coefficient of friction μ exceed this limit, the brake power distribution control system 11 for distribution of requested brake effect remains in its first operating mode, according to which distribution between service brake and auxiliary brake occurs in the usual way and the system is set to normal operation in a second function block 31. Should the coefficient of friction μ be below this limit, according to a preferred embodiment of the invention the temperature of the friction pair is determined in a third function block 32. Should the temperature T be below a temperature $T_G$, which represents the temperature at which there is a risk of a solid wear-resistant covering forming on the friction pair, the brake power distribution control system 11 is adjusted to its second operating mode in a fourth function block 33, according to which the distribution between service brake and secondary brake is undertaken so that the service brake is prioritized in order to allow an increased supply of energy to the service brake, bringing about reconditioning. Should the temperature T exceed the temperature limit $T_G$, the brake power distribution control system 11 remains in its first operating mode, resulting in normal operation in a second function block 31.

In a fifth function block 34, a check is performed as to whether the temperature T of the friction pair exceeds a critical temperature $T_c$ at which regeneration is possible. Should the temperature exceed this temperature limit $T_c$, according to a preferred embodiment the supplied braking energy E is calculated in a sixth function block 35 as the time integral of brake power supplied at a temperature in excess of the critical temperature limit. In a seventh function block 36, the coefficient of friction μ is determined as above, following which the coefficient of friction μ is compared with a limit μ representing a reconditioned friction pair. Should the coefficient of friction μ exceed the limit $μ_{rec}$, the brake power distribution control system 11 returns to its first operating mode, following which distribution between service brake and secondary brake occurs in the usual way and the system is set to normal operation in a second function block 31. If the coefficient of friction μ is below the limit $μ_{rec}$, according to a preferred embodiment a new check is commenced as to whether the temperature limit $T_G$ is exceeded in the third function block, or a new comparison is performed in the fifth function block 34 to establish whether the temperature exceeds the critical temperature at which reconditioning is possible.

According to one embodiment of the invention, the brake power distribution control system 11 can in its second operating mode redistribute the brake power between a plurality of axles. This means that one or more of the axles can be reconditioned whilst the remaining axles take up less or no brake power.

Figure 4:
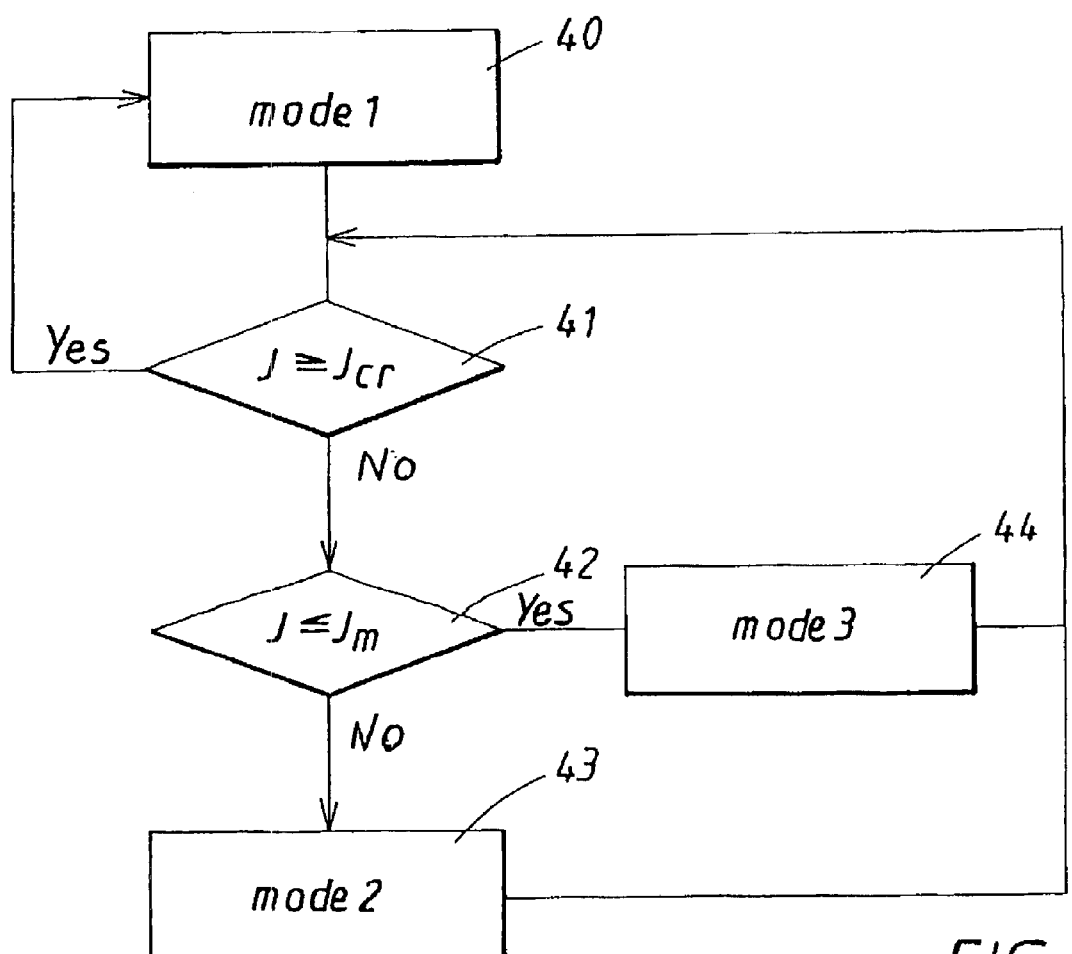
FIG. 4 shows an example of a first alternative embodiment of a flow chart for a method of reconditioning.

FIG. 4 shows an alternative embodiment of a flow chart for a method of reconditioning. According to this alternative embodiment of the invention, the said brake power distribution control system controls the distribution according to a first, a second and a third operating mode 40, 43 and 44. In the first operating mode 40, the auxiliary brake is prioritized with uniform addition of the service brake from the vehicle wheel axles. In the second operating mode 43 the auxiliary brake is prioritized whilst the brake power is distributed differently between the vehicle wheel axles. This means that one or more wheel axles of the vehicle can be reconditioned by boosting the brake power supplied to a higher level than if the brake power were being distributed uniformly between the axles. In the third operating mode the service brake is prioritized. In this case, too, the brake power can be distributed non-uniformly between a number of wheel axles, so as to increase the degree of reconditioning. According to the embodiment, a first test to determine a parameter value of the surface characteristic I is performed in a first function block 41. If the parameter value I exceeds a limit Icr, no reconditioning is performed and the brake system remains in its first mode, in which the auxiliary brakes are prioritized. If the parameter value I is below this limit Icr, a second test is performed, in which the parameter value is compared with a second limit Im. If the parameter value I is less than this limit Im, the brake system is set to the third brake mode 44, in which the service brake is prioritized. In one embodiment of the invention the third brake mode can be divided up into two sub-modes, a first sub-mode in which the brake power is distributed uniformly between wheel axles of the vehicle and a second sub-mode in which the brake power is distributed differently between wheel axles of the vehicle. If the brake power is distributed non-uniformly, increased reconditioning is obtained on those axles to which mode energy is fed. If the parameter value I is not less than the limit Im, but less than the limit Icr, the brake system is set to a second operating mode 43, in which auxiliary brakes are prioritized but the brake power is distributed differently between wheel axles of the vehicle. In this case it is possible to recondition one or more of the wheel axles of the vehicle. By switching between brake application on different axles, it is possible to ensure that the brakes are applied whilst absorbing sufficient power, so as to permit reconditioning.

Figure 5:
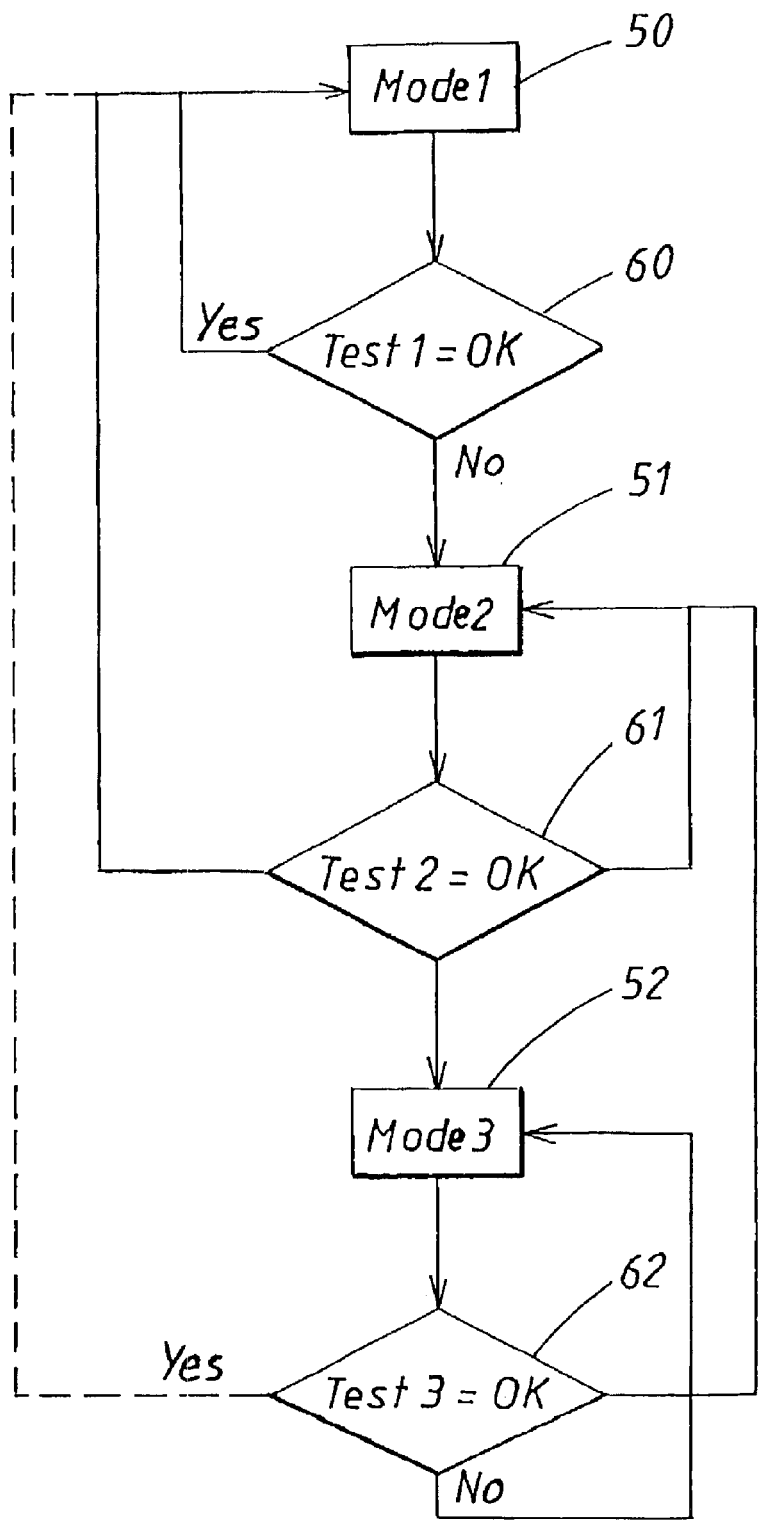
FIG. 5 shows an example of a second alternative embodiment of a flow chart for a method of reconditioning.

FIG. 5 shows an example of a second alternative embodiment of a flow chart for a method of reconditioning. The method of reconditioning comprises three separate operating modes.

In a first operating mode 50 the auxiliary brake is prioritized. The parameter value for the glazing and dirt and/or rust surface characteristics is updated in this operating mode.

In a second operating mode 51 the auxiliary brake is prioritized. In this operating mode the service brake is used on individual axles in cases where the service brake is used despite the prioritization of the auxiliary brake. This is done when the requested brake power exceeds a certain limit.

In a third operating mode 52 the service brake is prioritized.

A test routine 60, 61, 62 is linked to each operating mode 50, 51, 52. In these test routines 60–62 it is determined whether the method of reconditioning is to remain in one operating mode or be shifted to another operating mode. In the first test routine 60, which is associated with the first operating mode 50, it is decided whether the method of reconditioning is to remain in the first operating mode 50 or assume the second operating mode 51. In the second test routine 61, which is associated with the second operating mode 51, it is decided whether the method of reconditioning is to remain in the second operating mode 51, assume the first operating mode 50 or assume the third operating mode 52. In the third test routine 62, which is associated with the third operating mode 52, it is decided whether the method of reconditioning is to remain in the third operating mode 52 or assume the second operating mode 51. In one embodiment, it is feasible to assume the first operating mode 50 immediately after the third operating mode 52.

In one embodiment of the invention, switching between the operating modes as specified above is performed according to the following test routine:

| Parameter value | Measure |
| --- | --- |
| $I_{Gn} \leq 0$ and $I_{Sn} \leq 0$ | Switching from 1 to 2, from 2 to 3 |
| $I_{Gn} > 0$ and $I_{Sn} > 0$ and $I_{Gn} < 1$ or $I_{Sn} < 1$ | Remain in the operating mode |
| $I_{Gn} \geq 1$ and $I_{Sn} \geq 1$ | Switching from 2 to 1, from 3 to 2 |

The parameter values given in the table are explained in more detail below.

Figure 6:
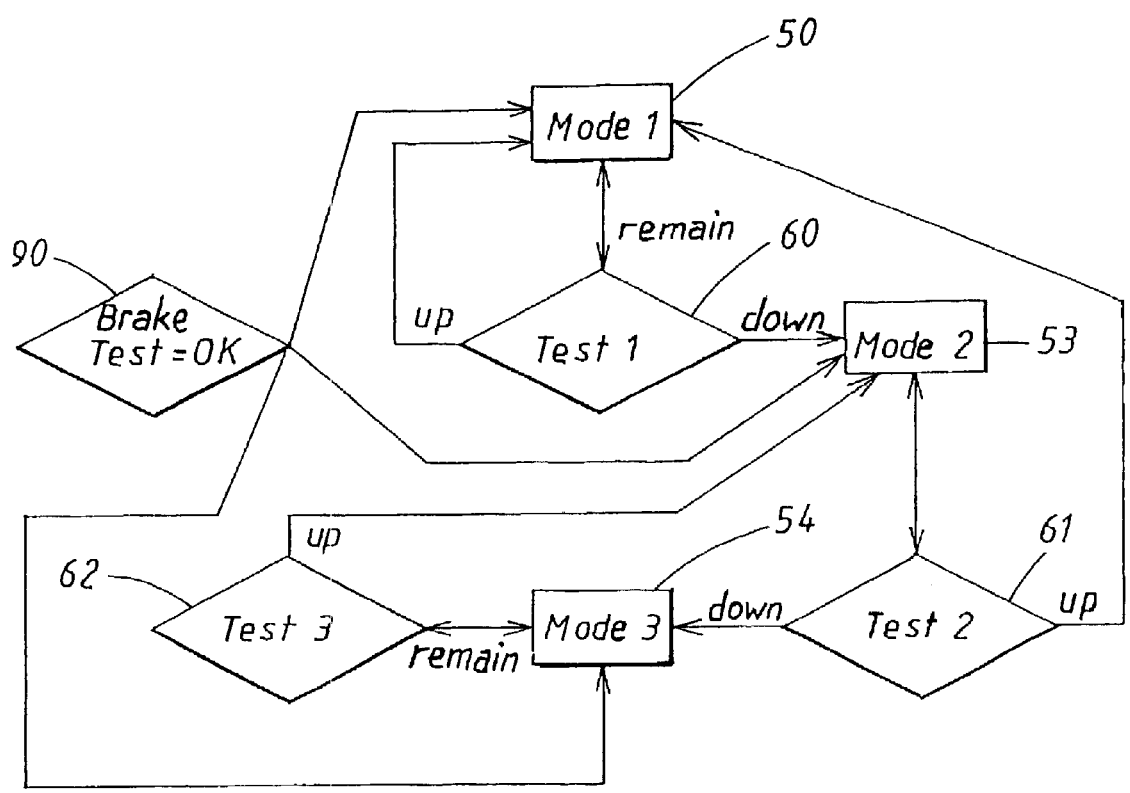
FIG. 6 shows an example of a third alternative embodiment of a flow chart for a method of reconditioning.

FIG. 6 shows an example of a second alternative embodiment of a flow chart for a method of reconditioning. The method of reconditioning comprises three separate operating modes.

In a first operating mode 50 the auxiliary brake is prioritized.

In a second operating mode 53 the service brake is prioritized. In this operating mode the service brake is used on individual axles, but both of the axles are used where the requested brake power exceeds a second limit, which signifies that the requested brake power cannot be obtained through the use of one axle.

In a third operating mode 54 a fault message is emitted or enforced braking is performed using the service brake.

A test routine 60, 61, 62 is linked to each operating mode 50, 53, 54. In these test routines 60–62 it is determined whether the method of reconditioning is to remain in one operating mode or be shifted to another operating mode. In the first test routine 60, which is associated with the first operating mode 50, it is decided whether the method of reconditioning is to remain in the first operating mode 50 or assume the second operating mode 51. In the second test routine 61, which is associated with the second operating mode 53, it is decided whether the method of reconditioning is to remain in the second operating mode 53, assume the first operating mode 50 or assume the third operating mode 54. In the third test routine 62, which is associated with the third operating mode 54, it is decided whether the method of reconditioning is to remain in the third operating mode 54 or assume the second operating mode 53. According to an alternative embodiment, it is feasible for the fault message according to the third operating mode to entail enforced monitoring of the vehicle, the vehicle after monitoring and any measures being returned to the first operating mode.

In one embodiment of the invention, switching between the operating modes as specified above is performed according to the following test routine:

| Parameter value | Measure |
| --- | --- |
| $I_{Gn} \leqq 0$ and $I_{Sn} \leqq 0$ | Switching from 1 to 2, from 2 to 3 |
| $I_{Gn} > 0$ and $I_{Sn} > 0$ and $I_{Gn} < 1$ or $I_{Sn} < 1$ | Remain in the operating mode |
| $I_{Gn} \geqq 1$ and $I_{Sn} \geqq 1$ | Switching from 2 to 1, from 3 to 2 |

According to a preferred embodiment, measurement of the coefficient of friction is furthermore carried out through an enforced braking in a separate stage 90 of the method. The coefficient of friction determined is used to verify whether the value of the glazing parameter is correctly estimated. If estimation has been correctly performed, the control unit remains in the current operating mode 50, 53, 54. If the glazing parameter has been incorrectly estimated, the glazing parameter is corrected by means of the information obtained from the measurement. The dirt covering parameter can also be similarly corrected, even though the measurement does not relate to the dirt covering. In a first approximation, the deviation can be assessed as proportional to the deviation of the glazing parameter. After correction of the parameter values, that operating mode is assumed, which is suited to obtaining the parameter value according to the above.

Stage 90 of the method may also be used in other embodiments, such as those described with reference to FIGS. 5 and 7.

Figure 7:
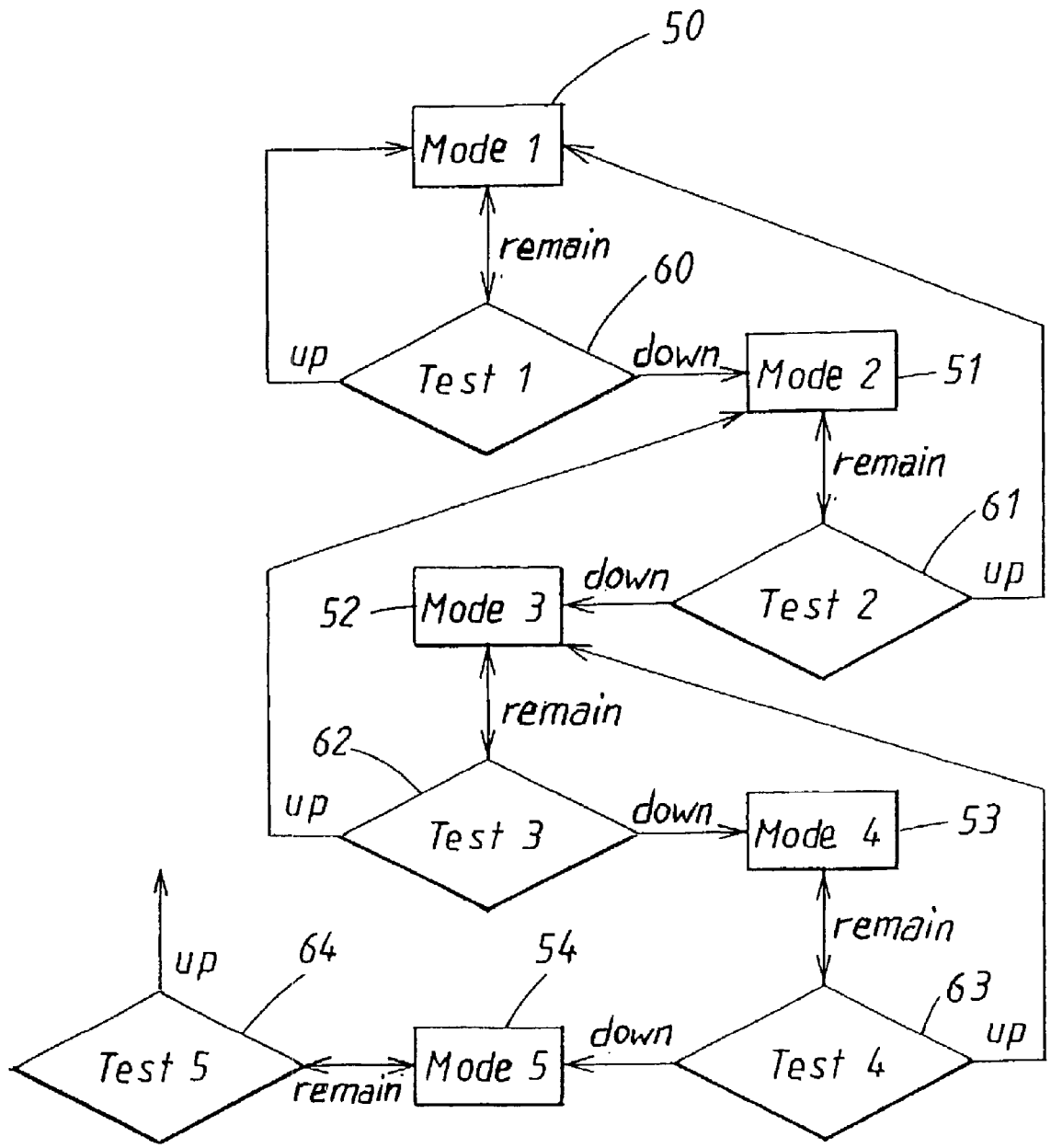
FIG. 7 shows an example of a third alternative embodiment of a flow chart for a method of reconditioning.

FIG. 7 shows an example of a second alternative embodiment of a flow chart for a method of reconditioning. The method of reconditioning comprises five separate operating modes.

In a first operating mode 50 the auxiliary brake is prioritized.

In a second operating mode 51 the auxiliary brake is prioritized. In this operating mode the service brake is used on individual axles should the service brake be used despite the prioritization of the auxiliary brake. This is done when the requested brake power exceeds a first limit. Both of the axles are used where the requested brake power exceeds a second limit, which is greater than the said first limit.

In a third operating mode 52 the service brake is prioritized.

In a fourth operating mode 53 the service brake is prioritized. In this operating mode the service brake is used on individual axles, but both of the axles are used where the requested brake power exceeds a second limit, which signifies that the requested brake power cannot be obtained through the use of one axle.

In a fifth operating mode 54 a fault message is emitted or enforced braking is performed using the service brake.

A test routine 60–64 is linked to each operating mode 50–54. In these test routines 60–64 it is determined whether the method of reconditioning is to remain in one operating mode or be shifted to another operating mode. In the first test routine 60, which is associated with the first operating mode 50, it is decided whether the method of reconditioning is to remain in the first operating mode 50 or assume the second operating mode 51. In the second test routine 61, which is associated with the second operating mode 51, it is decided whether the method of reconditioning is to remain in the second operating mode 51, assume the first operating mode 50 or assume the third operating mode 52. In the third test routine 62, which is associated with the third operating mode 52, it is decided whether the method of reconditioning is to remain in the third operating mode 52 or assume the second operating mode 51. In the fourth test routine 63, which is associated with the fourth operating mode 53, it is decided whether the method of reconditioning is to remain in the fourth operating mode 53, assume the third operating mode 52 or assume the fifth operating mode 54. In the fifth test routine 64 it is decided whether the method of reconditioning is to remain in the fifth operating mode 54, or assume another operating mode. According to one embodiment of the invention it is feasible, as an alternative to remaining in the fifth operating mode 54, to assume the fourth operating mode. According to an alternative embodiment it is feasible for the fault message according to the fifth operating mode to entail enforced monitoring of the vehicle, the vehicle after monitoring and any measures being returned to the first operating mode.

In one embodiment of the invention, switching between the operating modes as specified above is performed according to the following test routine:

| Parameter value | Measure |
| --- | --- |
| $I_{Gn} \leqq 0$ and $I_{Sn} \leqq 0$ | Switching from 1 to 2, from 2 to 3, from 3 to 4 and from 4 to 5 |
| $I_{Gn} > 0$ and $I_{Sn} > 0$ and $I_{Gn} < 1$ or $I_{Sn} < 1$ | Remain in the operating mode |
| $I_{Gn} \geqq 1$ and $I_{Sn} \geqq 1$ | Switching from 2 to 1, from 3 to 2, from 4 to 3 and from 5 to 4. |

The parameter values given in the table are explained in more detail below.

In this and previously described embodiments, the said parameter value for the surface characteristic is a function of the coefficient of friction and/or the degree of fouling and/or rusting of the friction pair.

According to one embodiment of the invention, the parameter value for the surface characteristic is estimated from a set of parameters including the time of year, geographical location, climate zone, atmospheric humidity, outdoor temperature, design of road network, fuel consumption, engine running time, total engine revolutions, time since last braking, time since last reconditioning, supply of braking energy, retardation history, application force of the brake system, temperature of the friction pair, bearing temperature and temperature of friction material fitted to brake shoes. The effect of the parameters on the parameter value for the surface characteristic such as the coefficient of friction is stored empirically in the form of a parameter mapping between the parameter value for the surface characteristic and given parameters.

The control strategy for brake use is influenced by the use of the said set of parameters as input data. The factor influencing the glazing status is primarily:

1) The number of brakings at a certain temperature. If the temperature does not exceed a certain critical temperature, the right friction film composition will not be obtained. The friction pair then has reduced friction.

The factors influencing the dirt and/or rust situation are primarily:

2) Amount of moisture. Moisture affects both rusting and fouling, a wet road, for example, resulting in more fouling than a dry road since as a particle-carrier the water carries and deposits more dirt than air.

3) Amount of salt. Salt increases rusting.

4) Amount of dirt. Dirt forms coverings on the disk, which affect brake lining wear and friction characteristics.

The above-mentioned characteristics can be estimated from the following information. An X indicates that the information has an influence on the factor in that column and hence on the parameter that indicates the status of glazing and rust/dirt. Certain information is redundant.

There is also information that influences glazing $c_G$ and information that influences rusting and/or fouling $c_S$ but is not associated with any of the information types 1–4.

| Type of information | 1 | 2 | 3 | 4 | $C_G$ | $C_S$ |
|---|---|---|---|---|---|---|
| $C_1$: Time of year. The time of year affects the precipitation, outdoor temperature, atmospheric humidity and road salting. | X | X | X | X | X | X |
| $C_2$: Time of day. The time of day affects the precipitation, outdoor temperature and atmospheric humidity. | X | X | X | X | X | X |
| $C_3$: Geographical location or climate zone | X | X | X | X | X | X |
| $C_4$: Outdoor temperature | X | | | | X | X |
| $C_5$: Atmospheric humidity | | X | | X | | X |
| $C_6$: Precipitation | | X | | X | X | X |
| $C_7$: Road salting | | | X | | | X |
| $C_8$: Design of road network provides information on how energy will be delivered to the brake system. | | | | | X | X |
| $C_9$: Status of the road network in terms of dirt. | | | | X | | X |
| $C_{10}$: Fuel consumption per km provides information on road status and how the brakes are used. | | | | X | | X |
| $C_{11}$: Engine running time, i.e. the length of time that the engine has been in operation provides information on how long the vehicle has been travelling and hence information on how long the parking brakes have been applied and hence the extent of the risk of unevenly distributed rust. | | | | | | X |
| $C_{12}$: Total engine revolutions indicates how long the vehicle has been travelling. | | X | X | | X | |
| $C_{13}$: Distance covered indicates how long the vehicle has been travelling and how much salt and dirt has got onto the brakes. | | X | X | | | X |
| $C_{14}$: Distance covered since last braking. | | X | X | | | X |
| $C_{15}$: Distance covered since last cleaning/reconditioning | | X | X | | | X |
| $C_{16}$: Supply of braking energy | | | | | X | X |
| $C_{17}$: Retardation history provides information on how the brake is used and can therefore be used to assess how clean and conditioned the brake is. | | | | | X | X |
| $C_{18}$: Application force or application pressure provides information on how the brake is used and can be used to estimate the energy supplied and temperature of the friction surface. | | | | | X | X |
| $C_{19}$: The speed provides information on how the brake is used and can be used to estimate the energy supplied and the temperature of the friction surface. | | | | | X | X |
| $C_{20}$: The temperature in the brake, rotor, lining, bearing or other part in proximity to the service brake can be used to estimate the temperature at the contact between lining and rotor. | | | | | X | X |

The parameter value for the surface characteristic may furthermore be given in the form of two parameters $I_G$ and $I_{R/S}$ where $I_G$ stands for the glazing index and $I_{R/S}$ stands for rust and dirt index. The parameter value for the surface characteristic can furthermore be represented by the coefficient of friction of the friction pair as described above. According to one embodiment of the invention the parameter value for the surface characteristic I is represented by a function, which can be described as follows:

$$I=\int f(P,T;X)dt+\int g(Y)ds \qquad 1)$$

Where f is a function of the input brake power P, the temperature T of the friction pair and X is a set of time-related parameters such as $C_1$ $C_7$, $C_9$, $C_{11}$, for example, and g is a function of distance-related parameters Y, such as $C_1$ $C_{10}$, $C_{12}$ $C_{15}$, for example.

In a time-discretized model, equation 1 may, after integration over a given time t and distance s, take the form:

$$I_{n+1}=I_n+\Sigma\alpha_A c_A \qquad 2)$$

where $I_{n+1}$ is the current value of the parameter value for the surface characteristic and $\alpha_A$ is a weighted function for a parameter $c_A$.

According to one embodiment of the invention the parameter value for the surface characteristic comprises the glazing parameters $c_G$, which represents the coefficient of friction parameter and the dirt and/or rust covering parameter $c_S$. In this case the time discretized model 2 may take the form:

$$I_{Gn+1}=I_{Gn}+\Sigma\alpha_A c_{GA} \qquad 3)$$

where $I_{Gn+1}$ is the current value of the glazing parameters and $\alpha_A$ represents a set of coefficients for a number of parameters $c_{GA}$ which influence the glazing of the friction pair, and $$I_{Sn+1}=I_{Sn}+\Sigma\beta_A c_{SA} \qquad 4)$$

where $I_{Sn+1}$ is the current value of the dirt and/or rusting parameters and $\beta_A$ represents a set of coefficients for a number of parameters $c_{SA}$ which influence the dirt and/or rusting of the friction pair.

$c_{GA}$ can be selected from the set of parameters included above which affect glazing and $c_{SA}$ can be selected from the set of parameters included above which affect dirt and/or rusting.

The coefficients $\alpha_A$ and $\beta_A$ are determined by empirical tests.

The recondition element in the functions 3 and 4, that is to say the elements which increase the parameter Is value are primarily represented by a measurement of the energy supply at a temperature of the friction pair in excess of a certain critical temperature limit. According to one embodiment of the invention, the reconditioning element can be expressed according to the following:

$$c_{Grek}=E^\gamma(T/Tcr)^\delta, \text{ when } T>Tcr \quad\quad 5)$$

$$c_{Grek}=0, \text{ då } T<Tcr$$

$$c_{Srek}=E^\gamma(T-Tcr)^\delta, \text{ when } T>Tcr \quad\quad 6)$$

$$c_{Srek}=0, \text{ when } T<Tcr$$

where E is represented by a brake energy input at a temperature T and Tcr is represented by a temperature limit when the reconditioning begins to take effect, γ and δ represent powers which are determined empirically. According to one embodiment of the invention γ=δ=1.

According to one specifically tested exemplary embodiment of the invention, the said surface characteristic is divided into a sub-function representing glazing with a parameter value $I_{Gn}$ and a sub-function representing rust and/or fouling with a parameter value $I_{Sn}$. The sub-functions are scaled so that the said parameter values will vary between the value 1 and 2, where the value 1 forms a set-point value for the said parameter values. Values lower than 1 indicate that the friction pair is in need of reconditioning and values higher than 1 indicate that the friction pair are not in need of reconditioning. In the said specific exemplary embodiment use is made of a reconditioning model according to the following table:

| Influence | Glazing ($I_{Gn}$) | Dirt and/or rusting ($I_{Sn}$) |
|---|---|---|
| Losses in the absence of braking | | |
| $C_{S1}$ = Distance covered The parameter value $I_{Sn}$ will be reduced from 1 to 0 after 500 km driving | | $\beta_1$ = −0.002/km |
| $C_{S2}$ = Time without braking The parameter value $I_{Sn}$ will be reduced from 1 to 0 after 100 hours | | $\beta_2$ = −0.01/h |
| Losses in braking | | |
| $C_{G1}$ = Supply of given amount of energy through braking at a temperature of less than 150° C. The parameter value $I_{Gn}$ will be reduced from 1 to 0 after 50 brakings from 60 km/h at a temperature of less than 150° C. | $\alpha_A$ = −0.03/MJ | |
| Reconditioning | | |
| $C_{Grek}$ and $C_{Srek}$ = (Esgn(T − Tc)) Supply of a given amount of energy through braking at a temperature exceeding Tc = 150° C. The parameter value $I_{Gn}$ | $\alpha_{rek}$ = +0.003/(MJ * T) | $\alpha_{rek}$ = +0.003/(MJ * T) |
| and $I_{Sn}$ will be increased from 0 to 1 after 5 brakings from 60 km/h at a temperature of 250° C. | | |

The table values are determined for a two-axle vehicle with a total weight of 20 tons, where a braking from 60 to 0 km/h represents braking energy supplied of 0.7 MJ per brake.

With the table values quoted, equations 3) and 4) assume the forms:

$$I_{Gn+1}=I_{Gn}-0{,}03c_{G1}+0{,}003Esgn(TTc) \quad\quad 3)$$

$$I_{Sn+1}=I_{Sn}-0{,}002c_{S1}-0{,}01c_{S2}+0{,}003Esgn(TTc) \quad\quad 4)$$

Figure 8:
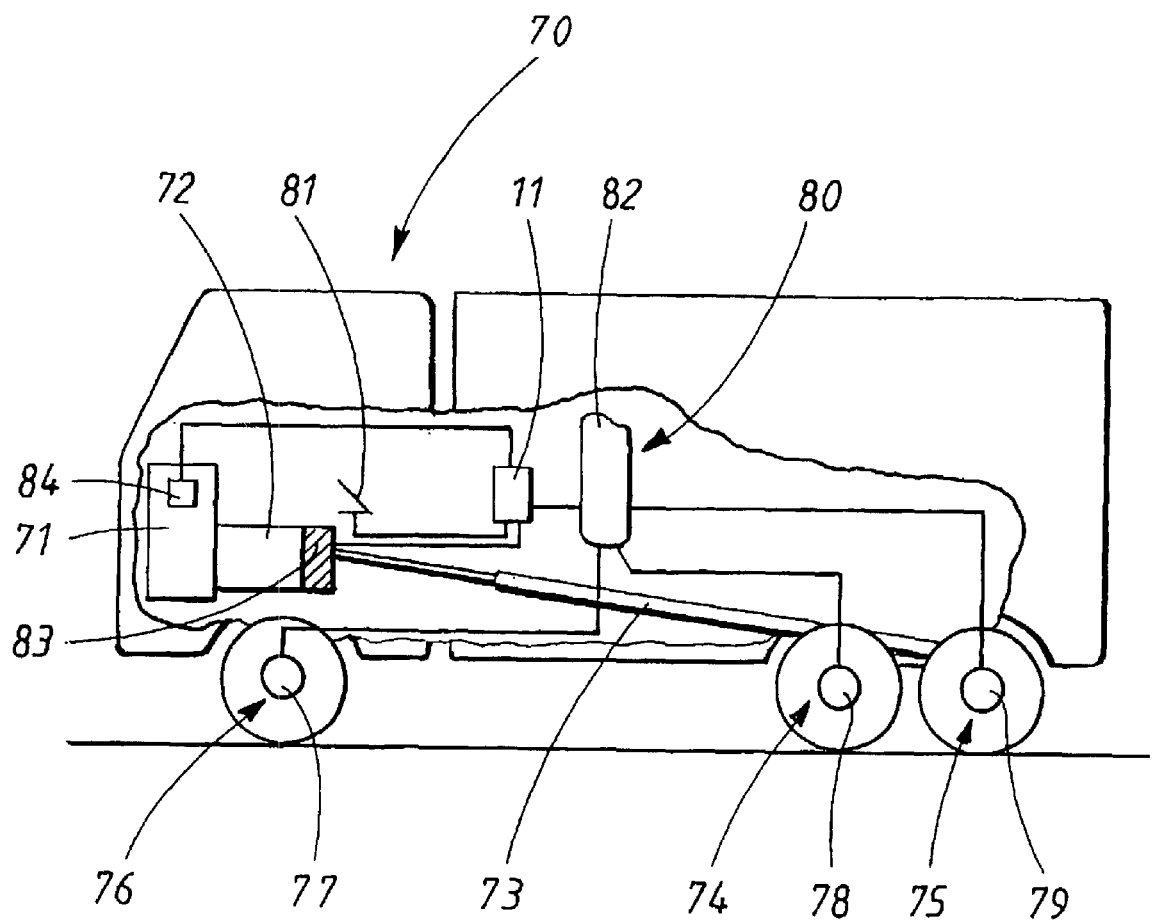
FIG. 8 shows a diagram of a vehicle in which the invention is utilized.

FIG. 8 shows a diagram of a vehicle 70, in which the invention is used. The vehicle shown is a heavy truck of conventional type and comprises an internal combustion engine 71, a gearbox 72 having a drive output shaft, which drives a set of driven axles 74, 75 via a cardan shaft 73. The vehicle also comprises a front axle 76, which in the example shown is not driven. The wheels on the driven and non-driven axles 74–76 are braked by service brakes 76–79 belonging to each axle and forming part of a brake system 80. The brake system is controlled by a brake pedal 81, through which a driver indicates the desired brake force. In the example shown, the brake pedal 81 sends a signal to a control computer 11, which distributes the brake power between the service brakes 76–79, which is done, for example, by means of a compressed air system 82 and auxiliary brakes in the form, for example, of a retarder 83 or an engine brake 84.

The invention is not limited to the embodiments described above but can be modified without departing from the scope of the following claims.

Additional embodiments may be characterized as follows:

One embodiment takes the form of a method for the reconditioning of a friction pair as described herein and in which the control system for the distribution of a requested brake power between the said service brake and secondary brake presents a further choice between—a fourth operating mode (53) in which the service brake is prioritized and the service brake is used on individual wheel axles, and—a fifth operating mode (54) in which a fault message is emitted or enforced braking occurs using the service brake.

The method further includes that the control system for the distribution of a requested brake power between the said service brake and secondary brake presents a choice between—a first operating mode (50) in which the auxiliary brake is prioritized,—a second operating mode (52) in which the service brake is prioritized, the method comprising the following stages—determination of a parameter value (I) for a reconditionable surface characteristic, such as the coefficient of friction, dirt or rust covering of the friction pair—selection of the operating mode as a function of the said parameter value determined.

In another aspect, the vehicle comprises a plurality of wheel axles each carrying service brakes, characterized in that the control system (11) for the distribution of a requested brake power between the said service brake and secondary brake further comprises:—a third operating mode (51) in which the auxiliary brake is prioritized and the service brake is used on individual wheel axles in the event that the service brake is used despite the prioritization of the auxiliary brake. In still another aspect, the control system for the distribution of a requested brake power between the said service brake and secondary brake presents a further choice between—a fourth operating mode (53) in which the service brake is prioritized and the service brake is used on individual wheel axles, and—a fifth operating mode (54) in which a fault message is emitted, or enforced braking occurs using the service brake.

In another embodiment, the vehicle comprises a service brake (2) of the drum or disc brake type, one or more auxiliary brakes (10), a control system (11) for the distribution of a requested brake power between the said service brake (2) and auxiliary brake (10) and an arrangement for the reconditioning (15, 16) of a friction pair (3) comprising a lining and a rotor forming part of the said service brake, characterized in that the said reconditioning arrangement comprises:—means (15) for determining a parameter value (I) of a reconditionable surface characteristic, such as the coefficient of friction, dirt or rust covering of the friction pair, for example—means (16) for supplying a defined braking energy (E) to the said friction pair as a function of the said parameter value determined.

In a complementary aspect, the vehicle further comprises an element for determining the temperature (14) of the friction pair (3) and that said means (16) for supplying a defined braking energy is arranged to supply the said defined braking energy (E) at a temperature of the said friction pair (3) which exceeds a defined regeneration temperature, thereby permitting reconditioning of the said friction pair.

In a complimentary aspect, the parameter value is a function of the coefficient of friction of the friction pair.

In a complimentary aspect, the means for determination (15) of the coefficient of friction is arranged to calculate the coefficient of friction from data on the force with which brake linings are applied against the rotor and retardation is estimated from a retardation test, in which linings forming part of the said service brake are applied with a defined force against the said rotor, following which the retardation of the vehicle is measured.

In a complimentary aspect, the means for determination (15) of a coefficient of friction is arranged to calculate the coefficient of friction from data on the force with which brake linings are applied against the rotor and retardation is estimated from an acceleration test, in which brake shoes forming part of the said service brake are applied with a defined force against the said rotor and an engine forming part of the vehicle is made to deliver an additional torque, following which the acceleration of the vehicle is measured.

In a complimentary aspect, the additional torque is suited to maintaining the speed of the vehicle.

In a complimentary aspect, the parameter value is a function of the dirt and/or rust covering of the friction pair.

In a complimentary aspect, the means (15) for determining a parameter value (I) for a reconditionable surface characteristic is arranged to estimate the parameter value for the reconditionable surface characteristic from a set of the following parameters: time of year, geographical location, climate zone, atmospheric humidity, outdoor temperature, design of road network, fuel consumption, engine running time, total engine revolutions, distance covered, distance covered since last braking, distance covered since last reconditioning, time since last braking, time since last reconditioning, supply of braking energy, retardation history, application force of the brake system, temperature of the friction pair, bearing temperature and temperature of friction material fitted to brake shoes.

In a complimentary aspect, the parameter value (I) for the reconditionable surface characteristic is estimated from the said set of parameters through the formation of a function $I_{n+1}=I_n+\Sigma\alpha_A c_A$, where $I_{n+1}$ is the current value of the parameter value and $\alpha_A$ is a weighted function for a parameter $c_A$.

In a complimentary aspect, the function is divided into a first sub-function $I_{Gn+1}=I_{Gn}+\Sigma\alpha_A c_{GA}$, where $I_{Gn+1}$ is the current value of the parameter value representing glazing and $\alpha_A$ represents a set of coefficients for a number of parameters $c_{GA}$ which influence the glazing of the friction pair, and a second sub-function $I_{Sn+1}=I_{Sn}+\Sigma\beta_A c_{SA1}$, where $I_{Sn+1}$ is the current value of the parameter value representing dirt and/or rusting and $\beta_A$ represents a set of coefficients for a number of parameters $c_{SA}$ which influence the dirt and/or rusting of the friction pair.

In a complimentary aspect, the reconditioning part of the said function and/or sub-function are described as $C_{Grek}=E^\gamma (T-Tcr)^\delta$, when $T>Tcr$, where E is represented by the input brake energy at a temperature T and Tcr is represented by a temperature limit at which reconditioning starts to take effect.

In a complimentary aspect, the means (14) for determining the temperature of the said friction pair is arranged to determine a current temperature value through information on use of the service brake in which a temperature margin, proportional to the energy supplied in each braking, is added to a previously current temperature value and a continuous temperature reduction is added in as a function of the said previously current temperature value and the time.

In a complimentary aspect, the means for determining the temperature comprises a temperature sensor, which detects the temperature of the friction pair, or an element which is thermally coupled to the friction pair.

In a complimentary aspect, the defined braking energy corresponds to an amount of energy that returns the value of the parameter value of the said friction pair to a defined limit.

In a complimentary aspect, the means (16) for supply of a defined braking energy is arranged to commence reconditioning when the parameter value of the said reconditionable surface characteristic is less than a defined limit.

In a complimentary aspect, the braking energy is a function of the difference between the said limit and the said parameter value for the surface characteristic.

In a complimentary aspect, the means (16) for supplying a defined braking energy is arranged to communicate with the said control system for the distribution of a requested brake power between the said service brake and secondary brake, following which the brake power supplied via the said service brake is prioritized in relation to brake power supplied via the said secondary brake, thereby ensuring sufficient energy for regeneration.

In a complimentary aspect, the control system for the distribution of a requested brake power between the said service brake and secondary brake presents a choice between—a first operating mode (50) in which the auxiliary brake is prioritized,—a second operating mode (52) in which the service brake is prioritized, the method comprising the following stages:—determination of a parameter value (I) for a reconditionable surface characteristic, such as the coefficient of friction, dirt or rust covering of the friction pair-selection of the operating mode as a function of the said parameter value determined.

In a complimentary aspect, the vehicle comprises a plurality of wheel axles each carrying service brakes, characterized in that the control system (11) for the distribution of a requested brake power between the said service brake and secondary brake further comprises:—a third operating mode (51) in which the auxiliary brake is prioritized and the service brake is used on individual wheel axles in the event that the service brake is used despite the prioritization of the auxiliary brake.

In a complimentary aspect, the control system for the distribution of a requested brake power between the said service brake and auxiliary brake presents a further choice between—a fourth operating mode (53) in which the service brake is prioritized and the service brake is used on individual wheel axles, and—a fifth operating mode (54) in which a fault message is emitted, or enforced braking occurs using the service brake.

In a complimentary aspect, the vehicle comprises a plurality of wheel axles each carrying service brakes, characterized in that said means (16) for the supply of a defined braking energy is arranged to communicate with the said brake power distribution control system, according to which brake energy supplied is distributed between the said plurality of wheel axles.

In a complimentary aspect, the control system for the distribution of a requested brake power between the said service brake and secondary brake presents a choice between—a first operating mode (50) in which the auxiliary brake is prioritized,—a second operating mode (51) in which the auxiliary brake is prioritized and the service brake is used on individual wheel axles in the event that the service brake is used despite the prioritization of the auxiliary brake, this being done where the requested brake force exceeds a first limit, and—a third operating mode (52) in which the service brake is prioritized.

In a complimentary aspect, the control system for the distribution of a requested brake power between the said service brake and secondary brake presents a further choice between—a fourth operating mode (53) in which the service brake is prioritized and the service brake is used on individual wheel axles, and—a fifth operating mode (54) in which a fault message is emitted or enforced braking occurs using the service brake.

In a complimentary aspect, the means (16) for supplying the said defined braking energy is arranged to supply a defined braking energy within a temperature interval at a temperature of the friction pair which exceeds a regeneration temperature limit and is less than a temperature limit $T_G$ at which a solid wear-resistant covering forms on the friction pair.

In yet a further embodiment, the invention takes the form of a method for the reconditioning of a friction pair (3) comprising a lining and a rotor in a service brake of the drum or disc brake type forming part of a brake system in a vehicle, which in addition to the said service brake comprises one or more auxiliary brakes (10) and a control system (11) for the distribution of a requested brake power between the said service brake and secondary brake, in which the control system for the distribution of a requested brake power between the said service brake and secondary brake presents a choice between:—a first operating mode (50) in which the auxiliary brake is prioritized,—a second operating mode (52) in which the service brake is prioritized, the method comprising the following stages:—determination of a parameter value (I) for a reconditionable surface characteristic, such as the coefficient of friction, dirt or rust covering of the friction pair, for example—selection of the operating mode as a function of the said parameter value determined.

In a complimentary aspect, the vehicle comprises a plurality of wheel axles each carrying service brakes, characterized in that the control system (11) for the distribution of a requested brake power between the said service brake and secondary brake further comprises:—a third operating mode (51) in which the auxiliary brake is prioritized and the service brake is used on individual wheel axles in the event that the service brake is used despite the prioritization of the auxiliary brake.

In a complimentary aspect, the control system for the distribution of a requested brake power between the said service brake and secondary brake presents a further choice between—a fourth operating mode (53) in which the service brake is prioritized and the service brake is used on individual wheel axles, and—a fifth operating mode (54) in which a fault message is emitted, or enforced braking occurs using the service brake.

What is claimed is:

1. Method for the reconditioning of a friction pair (3) comprising a lining and a rotor in a service brake (2) of the drum or disc brake type forming part of a brake system of a vehicle, which in addition to the service brake (2) comprises one or more auxiliary brakes (10) and a control system (11) for distribution of the requested brake power between the service brake and auxiliary brake or auxiliary brakes, the method comprising the following stages:

determination (30, 41) of a parameter value (I) for a reconditionable surface characteristic;

reconditioning (33, 43, 44) the friction pair through the supply of a defined braking energy (E), as a function of said parameter value (I) determined for said friction pair (3) and wherein said parameter value is estimated from the set of parameters through the formation of a function $I_{n+1}=I_n+\Sigma\alpha a_A C_A$, where $I_{n+1}$ is the current value of the parameter value and $\alpha_A$ is a weighted function for a parameter $C_A$.

2. Method for the reconditioning of a friction pair according to claim 1, wherein die method comprises the following stages:

determination (32) of the temperature of the friction pair reconditioning (35) of the friction pair through the supply of a defined braking energy, as a function of said parameter value (I) determined for said friction pair (3) at a temperature of the friction pair which exceeds a defined regeneration temperature.

3. Method for the reconditioning of a friction pair according to claim 1, wherein said parameter value is a function of the coefficient of friction of the friction pair.

4. Method for the reconditioning of a friction pair according to claim 3, wherein said coefficient of friction is determined by a retardation test, in which linings forming part of said service brake are applied with defined force against the rotor, following which the retardation of the vehicle is measured and the coefficient of friction is calculated from data on said force and retardation.

5. Method for the reconditioning of a friction pair according to claim 3, wherein said coefficient of friction is determined by an acceleration test, in which linings forming part of said service brake are applied with defined force against the rotor, and an engine forming part of the vehicle is made to deliver an additional torque, following which the acceleration of the vehicle is measured and the coefficient of friction is calculated from data on said force, acceleration and additional torque.

6. Method for the reconditioning of a friction pair according to claim 5, wherein said additional torque is suited to maintaining the speed of the vehicle.

7. Method for the reconditioning of a friction pair according to claim 1, wherein said parameter value for the reconditionable surface characteristic is a function of the degree of rusting and/or fouling of the friction pair.

8. Method for the reconditioning of a friction pair according to claim 1, wherein said parameter value is estimated from a set of the following parameters: time of year, geographical location, climate zone, atmospheric humidity, outdoor temperature, design of road network, fuel consumption, engine running time, total engine revolutions, distance covered, distance covered since last braking, distance covered since last reconditioning, time since last braking, time since last reconditioning, supply of braking energy, retardation history, application force of the brake system, temperature of the friction pair, bearing temperature and temperature of friction material fitted to brake shoes.

9. Method for the reconditioning of a friction pair (3) comprising a lining and a rotor in a service brake (2) of the drum or disc brake type forming part of a brake system of a vehicle, which in addition to the service brake (2) comprises one or more auxiliary brakes (10) and a control system (11) for distribution of the requested brake power between the service brake and auxiliary brake or auxiliary brakes, the method comprising the following stages:

determination (30, 41) of a parameter value (I) for a reconditionable surface characteristic; and reconditioning (33, 43, 44) the friction pair through the supply of a defined braking energy (E), as a function of said parameter value (I) determined for said friction pair (3), wherein said parameter value is estimated from a set of the following parameters: time of year, geographical location, climate zone, atmospheric humidity, outdoor temperature, design of road network, fuel consumption, engine running time, total engine revolutions, distance covered, distance covered since last braking, distance covered since last reconditioning, time since last braking, time since last reconditioning, supply of braking energy, retardation history, application force of the brake system, temperature of the friction pair, bearing temperature and temperature of friction material fitted to brake shoes and further wherein said function is divided into a first sub-function $I_{Gn+1}=I_{Gn}+\Sigma\alpha_A c_{GA}$, where $I_{Gn+1}$ is the current value of the glazing parameters and $\alpha_A$ represents a set of coefficients for a number of parameters $c_{GA}$ which influence the glazing of the friction pair, and a second sub-function $I_{Sn+1}=I_{Sn}+\Sigma\beta_A c_{GA}$ where $I_{Sn+1}$ is the current value of the dirt and/or rusting parameters and $\beta_A$ represents a set of coefficients for a number of parameters $c_{SA}$ which influence the dirt and/or rusting of the friction pair.

10. Method for the reconditioning of a friction pair according to claim 1, wherein the reconditioning part of said function and/or sub-function are described as $C_{GreK}=E^\gamma(T-Tcr)^\delta$, when T>Tcr, where E is represented by the input brake energy at a temperature T and Tcr is represented by a temperature limit at which reconditioning starts to take effect.

11. Method for the reconditioning of a friction pair according to any of claim 2, wherein the temperature of the friction pair (3) is determined through information on use of the service brake (2) in which a temperature margin, proportional to the energy supplied in each braking is added to a current temperature value, and a continuous temperature reduction is added in as a function of the current temperature value and the time.

12. Method for the reconditioning of a friction pair according to any of claim 2, wherein the temperature of the friction pair (3) is determined by a temperature sensor (14), which detects the temperature of the friction pair (3), or an element which is thermally coupled to the friction pair.

13. Method for the reconditioning of a friction pair according to any of claim 1, wherein said defined braking energy corresponds to an amount of energy that returns the parameter value for the reconditionable surface characteristic of the friction pair to a defined limit.

14. Method for the reconditioning of a friction pair according to claim 1, wherein said reconditioning is commenced when the parameter value of said reconditionable surface characteristic is less than a defined limit.

15. Method for the reconditioning of a friction pair according to claim 14, wherein said defined braking energy is a function of the difference between said limit and said parameter value for the surface characteristic.

16. Method for the reconditioning of a friction pair according to any of claim 1, wherein said supply of a defined braking energy is achieved in that said control system (11) for the distribution of a requested brake power between said service brake (2) and auxiliary brake (10) prioritizes brake power supplied via said service brake (2) in relation to brake power supplied via said auxiliary brake (10), thereby ensuring sufficient energy for regeneration.

17. Method for the reconditioning of a friction pair according to claim 1, in which the vehicle comprises a plurality of wheel axles each carrying service brakes (2), wherein said supply of a defined braking energy is achieved in that the brake power distribution control system (11) distributes the brake energy supplied differently between said plurality of axles.

18. Method for the reconditioning of a friction pair according to claim 1, wherein supply of said defined braking energy is performed within a temperature interval at a temperature of the friction pair which exceeds a regeneration temperature limit and is less than a temperature limit T at which a solid wear-resistant covering forms on the friction pair.

19. Method for the reconditioning of a friction pair according to claim 1, in which the vehicle comprises a plurality of wheel axles each carrying service brakes, wherein the control system for the distribution of a requested brake power between the service brake and secondary brake presents a choice between a first operating mode (50) in which the auxiliary brake is prioritized, a second operating mode (51) in which the auxiliary brake is prioritized and the service brake is used on individual wheel axles in the event that the service brake is used despite the prioritization of the auxiliary brake, this being done where the requested brake force exceeds a first limit, and a third operating mode (52) in which the service brake is prioritized.

20. Method for the reconditioning of a friction pair (3) comprising a lining and a rotor in a service brake (2) of the drum or disc brake type forming part of a brake system of a vehicle, which in addition to said service brake (2) comprises one or more auxiliary brakes (10) and a control system (11) for distribution of the requested brake power between said service brake and auxiliary brake or auxiliary brakes, the method comprising the following stages:

determination (30, 41) of a parameter value (I) for a reconditionable surface characteristic; and reconditioning (33, 43, 44) the friction pair through the supply of a defined braking energy (E) as a function of said parameter value (I) determined for said friction pair (3), and wherein said supply of a defined braking energy is achieved in that said control system (11) for the distribution of a requested brake power between said service brake (2) and auxiliary brake (10) prioritizes brake power supplied via said service brake (2) in relation to brake power supplied via said auxiliary brake (10), thereby ensuring sufficient energy for regeneration.

21. Method for the reconditioning of a friction pair (3) comprising a lining and a rotor in a service brake (2) of the drum or disc brake type forming part of a brake system of a vehicle, which in addition to said service brake (2) comprises one or more auxiliary brakes (10) and a control system (11) for distribution of the requested brake power between said service brake and auxiliary brake or auxiliary brakes, the method comprising the following stages:

determination (30, 41) of a parameter value (I) for a reconditionable surface characteristic; and reconditioning (33, 43, 44) the friction pair through the supply of a defined braking energy (E) as a function of said parameter value (I) determined for said friction pair (3) and wherein the vehicle further comprises a plurality of wheel axles each carrying service brakes (2), wherein said supply of a defined braking energy is achieved in that the brake power distribution control system (11) distributes the brake energy supplied differently between said plurality of axles.

22. Method for the reconditioning of a friction pair (3) comprising a lining and a rotor in a service brake (2) of the drum or disc brake type forming part of a brake system of a vehicle, which in addition to said service brake (2) comprises one or more auxiliary brakes (10) and a control system (11) for distribution of the requested brake power between said service brake and auxiliary brake or auxiliary brakes, the method comprising the following stages:

determination (30, 41) of a parameter value (I) for a reconditionable surface characteristic; and reconditioning (33, 43, 44) the friction pair through the supply of a defined braking energy (E) as a function of said parameter value (I) determined for said friction pair (3) and wherein the supply of said defined braking energy is performed within a temperature interval at a temperature of the friction pair which exceeds a regeneration temperature limit and is less than a temperature limit T at which a solid wear-resistant covering forms on the friction pair.

23. Method for the reconditioning of a friction pair (3) comprising a lining and a rotor in a service brake (2) of the drum or disc brake type forming part of a brake system of a vehicle, which in addition to said service brake (2) comprises one or more auxiliary brakes (10) and a control system (11) for distribution of the requested brake power between said service brake and auxiliary brake or auxiliary brakes, the method comprising the following stages:

determination (30, 41) of a parameter value (I) for a reconditionable surface characteristic; and reconditioning (33, 43, 44) the friction pair through the supply of a defined braking energy (E) as a function of said parameter value (I) determined for said friction pair (3), and wherein vehicle comprises a plurality of wheel axles each carrying service brakes, wherein the control system for the distribution of a requested brake power between said service brake and secondary brake presents a choice between (a) a first operating mode (50) in which the auxiliary brake is prioritized, (b) a second operating mode (51) in which the auxiliary brake is prioritized and the service brake is used on individual wheel axles in the event that the service brake is used despite the prioritization of the auxiliary brake, this being done where the requested brake force exceeds a first limit, and (c) a third operating mode (52) in which the service brake is prioritized.

* * * * *